US 6,533,856 B1

(12) United States Patent
Hodges et al.

(10) Patent No.: US 6,533,856 B1
(45) Date of Patent: Mar. 18, 2003

(54) TANNIN STAIN INHIBITOR COMPRISING AN ALUMINATE SALT COMPLEXING AGENT

(75) Inventors: Steve A. Hodges, Crown Point, IN (US); Wendy Novelli, Chicago Heights, IL (US); Andrew Thorn, Merrillville, IN (US); Mary Ann Sapp, Schererville, IN (US)

(73) Assignee: Hammond Group, Inc., Hammond, IN (US)

( * ) Notice: Subject to any disclaimer, the term of this patent is extended or adjusted under 35 U.S.C. 154(b) by 0 days.

(21) Appl. No.: 09/941,470

(22) Filed: Aug. 29, 2001

(51) Int. Cl.$^7$ .................. C09D 5/00; C09D 15/00; C08K 3/10
(52) U.S. Cl. .................. 106/287.17; 106/15.05; 106/18.32; 106/401; 427/397; 427/429; 524/437
(58) Field of Search ............. 106/15.05, 18.32, 106/287.17, 401; 427/397, 429; 524/437

(56) References Cited

U.S. PATENT DOCUMENTS

| | | | | |
|---|---|---|---|---|
| 3,852,087 A | * | 12/1974 | Nordyke et al. ......... | 106/286.4 |
| 3,900,619 A | * | 8/1975 | Lalk et al. ............... | 106/18.33 |
| 3,900,620 A | * | 8/1975 | Gilman et al. ........... | 427/325 |
| 4,007,252 A | * | 2/1977 | Burroughs ............... | 252/403 |
| 4,021,398 A | * | 5/1977 | Gilman et al. ........... | 524/161 |
| 4,218,516 A | * | 8/1980 | Meyer et al. ............. | 106/471 |
| 5,320,872 A | * | 6/1994 | McNeel et al. ........... | 427/325 |
| 5,460,644 A | * | 10/1995 | Thomassen .............. | 106/15.05 |
| 5,527,619 A | * | 6/1996 | Rokowski et al. ........ | 427/397 |
| 5,529,811 A | * | 6/1996 | Sinko ....................... | 106/419 |
| 5,759,705 A | * | 6/1998 | Sinko ....................... | 427/325 |
| 6,113,989 A | * | 9/2000 | Sinko ....................... | 427/382 |
| 6,245,141 B1 | * | 6/2001 | Walker et al. ........... | 106/287.19 |

FOREIGN PATENT DOCUMENTS

| EP | 482 961 | * | 4/1992 |
|---|---|---|---|
| EP | 622 427 | * | 11/1994 |
| WO | 98/29489 | * | 7/1998 |

* cited by examiner

*Primary Examiner*—Anthony Green
(74) *Attorney, Agent, or Firm*—Patula & Associates, P.C.

(57) ABSTRACT

A tannin stain inhibitor and method of blocking tannin stain migration within wood or wood composite substrates uses an aluminate based chemical composition. The aluminate based complex chemical composition is incorporated into a conventional coating product, which when applied to a wood or wood composite substrate, exhibits improved tannin stain inhibiting properties.

43 Claims, No Drawings

TANNIN STAIN INHIBITOR COMPRISING AN ALUMINATE SALT COMPLEXING AGENT

The present invention relates generally to tannin stain inhibitors, and in particular to an improved tannin stain inhibitor in the form of a paint or stain additive for blocking tannin leachate and migration inherent with conventional wood and wood composite substrates. More specifically, the present invention is a tannin stain inhibitor comprising an aluminate salt complexing agent resulting in improved inhibiting of tannin leachate.

BACKGROUND OF THE INVENTION

A common problem with the use of conventional paint and stain coating products on typical wood and wood composite substrates and surfaces is the leaching of tannins from the wood, resulting in unsightly tannin stains on the painted surface. Tannin is a soluble complex group of compounds that occurs naturally in all wood and plant materials. However, the tannin cannot be effectively or efficiently removed from the wood or wood composite substrate prior to paint or stain application. As such, to avoid unsightly tannin staining, tannin leachate must be blocked or inhibited. Cedar and redwood are examples of two common types of wood suffering from severe tannin leachate and subsequent migration problems, however every wood species contains some form of organic water soluble tannic acid compounds.

Tannins easily dissolve in liquids, such as conventional paints and stains, to form water-soluble tannate salts, which in turn form adversely colored water-soluble or water-dispersible complexes. With the use of conventional paint and stain coating systems, which includes a first primer coat followed by a plurality of surface coats, tannin has a natural tendency to leach through the paint or stain coatings during the drying phase while the coat still retains moisture. The tannin is subsequently solublized by the alkaline properties of the paint or stain and migrated to the surface coat. Prolonged effects of tannin migration occur when the previously painted or stained wood or wood composite substrate is exposed to moisture, such as rainwater, wherein wetness is reintroduced into the coating system and the encapsulated tannins are subsequently solublized. This occurs notwithstanding the quality of the paint or stain, the amount of coatings applied, or the thickness of each subsequent coating.

The leached tannin adversely discolors the surface coat, thereby leaving a permanently unfavorable stained impression. This is mainly due to the easy solubility of the tannin compound. However, the discoloration and staining effect the tannin has on the surface coat is reliant upon many factors. For example, such factors include time, humidity, pressure, temperature, and other environmental variables.

It is well known in the industry that with the introduction of certain complex chemical additives with active ions into paint and staining products prior to the application of paint or stain onto the wood or wood composite substrate, the tannic acids can be neutralized and subsequent tannin leaching and migration can be controlled.

This is either accomplished by ultimately minimizing the effect the tannin staining appears to have on the surface coat color or by controlling the amount of tannin that migrates through coating layers. However, attempts at producing a reliable, efficient, and environmentally safe tannin-inhibiting compound have proved to be extremely difficult. Either the inhibiting additive has detrimental effects upon the coating system itself, such as degradation of product viscosity, stability or longitivity, or the additive changes the properties of the paint or stain so much that it is not practical for commercial use.

U.S. Pat. No. 3,852,087 to Nordyke et al., issued on Dec. 3, 1974, discloses a composite compound paint pigment for blocking tannin stains. The composite pigment is added into a conventional paint and subsequently blocks the leaching and migration of tannate salts to the surface coat layer. The composite pigment is based upon an aluminum metal hydrate. However, a drawback to such an additive is that the aluminum metal hydrate is not highly soluble and thus not as effective or efficient as the present invention which does not use an aluminum metal hydrate, is in liquid form and uses a stabilizing agent to reduce precipitation.

U.S. Pat. No. 3,900,620 to Gilman et al., issued on Aug. 19, 1975, discloses the use of a basic aluminum halide tannin stain inhibitor paint additive. Once again, the '620 patent is somewhat effective in inhibiting tannin migration. However, the aluminum hydroxide reaction to create the basic aluminum halide is solublized in a strong acid, thus creating a lower pH soluble form of aluminum, and subsequently destabilizing a typical alkaline coating system. The present invention is not acidic and thus is more stable and safer to handle than the '620 patent. Furthermore, the '620 patent is intended to be used as a preparation coat within a conventional coating system with subsequent, additive-free paint coats, whereas the present invention incorporates the tannin stain inhibiting additive within the complete coating system, as well the ability to be used independently as a pre-treatment.

U.S. Pat. No. 4,792,357 to Bier, issued on Dec. 20, 1988, discloses the use of a water-soluble salt, along with several other ionic compounds, within a tannin stain blocking paint additive. The '357 patent works on the premise of removing one of the available ions in tannate salts, thus rendering the resultant tannate salt less soluble. However, the '357 patent is intended to be used on stained interior building surfaces, unlike the present invention which is intended for use on any painted or stained wood or wood composite substrate or surface, which receive more environmental contamination. Furthermore, the '357 patent does not address the destabilizing effect that aluminate salts has with conventional paint coating products, whereas the present invention uses a stabilizing agent to prevent precipitation and to enhance pH buffering.

U.S. Pat. No. 5,512,323 to Beane et al., issued on Apr. 30, 1996, discloses a wood pretreatment tannin stain inhibitor. The pretreatment is applied to a wood substrate prior to the application of a conventional water-based paint or stain product and is not intended to be a paint or stain additive, unlike the present invention. Furthermore, the '323 patent discloses the use of an acidic aluminum salt as the chemical stain blocking composition. However, the use of the aluminum-based salt causes the pretreatment to have an acidic quality with a pH of between 2.5 and 6.5, thus establishing the potential for subsequent coating failure. Furthermore, the '323 patent is not intended to be incorporated within a coating system, but rather is used as an independent coating and/or pre-treatment product prior to using a conventional coating system, unlike the present invention which incorporates the tannin stain inhibiting additive into a conventional coating product, thus negating the need for substrate pre-treatment.

U.S. Pat. No. 5,320,872 to McNeel et al., issued on Jun. 14, 1994, discloses a tannin blocking paint additive that uses a metal salt of phosphonic acid as its complexing agent. The phosphonic acid, such as aluminum phosphonate, is a different complexing agent than that disclosed within the present invention and is not as stable as the present invention.

U.S. Pat. No. 5,989,515 to Watanabe et al., issued on Nov. 23, 1999, discloses a stabilizing alumina sol in a stable acidic and aqueous form. However, the disclosed invention does not disclose, suggest or address the concerns of stabilizing a sodium aluminate salt in an aqueous form or using an aluminate salt complexing agent as a coating system additive to inhibit tannin migration as in the present invention.

U.S. Pat. No. 6,113,989 to Sinko, issued on Sep. 5, 2000, discloses the use of a zirconium zinc complex compound for inhibiting tannate salt production in conventional water-based latex paints. However, the disclosed invention does not teach the incorporation of an aluminate salt into paints or staining products for tannin stain inhibition as in the present invention.

U.S. Pat. No. 4,007,252 to Burroughs, issued on Feb. 8, 1977, discloses the use of triethanolamine with sodium aluminate in order to stabilize the sodium aluminate within an aqueous solution, thus preventing precipitation of the aluminate. However, the '252 patent does not teach or suggest using triethanolamine with sodium aluminate, a solvent, and water to create a tannin stain blocking, paint or stain coating system additive, as in the present invention. Furthermore, the '252 patent does not teach the use of triethanolamine to buffer the natural alkaline properties of the tannin stain inhibiting additive, whereas the present invention uses triethanolamine as both a stabilizing agent and a pH buffer.

The present invention overcomes the disadvantages and/or shortcomings of known prior art tannin stain inhibitors and provides a significant improvement thereover.

OBJECTS OF THE INVENTION

An object of the present invention is to provide an effective and stable aluminate salt tannin stain blocking agent.

Yet, another object of the present invention is to provide an aluminate salt tannin stain blocking agent in conventional paint and stain coating systems.

Yet another object of the present invention is to provide a tannin stain paint or stain additive that does not detrimentally degrade the stability, viscosity, pH, or human handling properties of conventional wood substrate coating systems.

Yet another object of the present invention is to provide a mixable tannin stain blocking additive which can be incorporated into a conventional wood substrate coating system in order to minimize a coating procedure by negating the need for conventional pretreatment and/or multiple paint or stain coats.

Yet another object of the present invention is to provide a mixable tannin stain blocking additive able to be directly incorporated into a composite wood product (ceiling tiles, particle board, composite wood siding and flooring, etc . . .) during manufacture so that the tannin stain blocking additive is a part of the composite wood product matrix in order to more effectively prohibit the migration of tannins when the composite wood product is coated.

Yet another object of the present invention is to provide a tannin stain blocking additive as a pre-treatment or pre-wash for wood and wood composite substrates and surfaces prior to applying a coating or stain.

Numerous other objects, features and advantages of the present invention will become readily apparent through the detailed description of the preferred embodiment, drawings and the claims.

SUMMARY OF THE INVENTION

A tannin stain inhibitor and method of blocking tannin stain migration within wood or wood composite substrates uses an aluminate based chemical composition is disclosed herein. The aluminate based complex chemical composition is preferably incorporated into a conventional coating product, which when applied to a wood or wood composite substrate, exhibits improved tannin stain inhibiting properties. Alternately, the aluminate based complex chemical composition can be added into a paint or stain coating resin, applied directly to a wood or wood composite substrate, or directly added into a wood composite material during the material manufacturing process.

DETAILED DESCRIPTION OF THE PREFERRED EMBODIMENT

While the invention is susceptible of embodiment in many different forms, there will be described herein in detail, preferred and alternate embodiments of the present invention. It should be understood, however, that the present disclosure is to be considered an exemplification of the principles of the invention and is not intended to limit the spirit and scope of the invention and/or claims of the embodiment illustrated.

The preferred embodiment of the present invention is a tannin stain inhibitor with an active complex compound using an aluminate salt as a complexing agent. The incorporation of an aluminate salt into the tannin stain inhibitor creates a reactive nature of the aluminum in a basic soluble form, and therefore provides a stable, aqueous solution.

The preferred embodiment of the present invention uses a mixture of a complexing agent, a stabilizing agent, a solvent and water to form the tannin stain inhibitor. More specifically, the present invention uses a mixture of water, an aluminate salt as the complexing agent, an aminoethanol compound as the stabilizing agent and propylene glycol as the solvent. The stabilizing agent is added to buffer any residual aluminum hydroxide in order to control undesirable additive precipitation and destabilization. Furthermore, the stabilizing agent provides a buffering of the pH level of the mixed paint or stains.

In general, the preferred embodiment of the present invention uses a 38.0% to 45.0% solution of sodium aluminate salt at 40.0% to 47.4% total formula weight, cold tap water at 32.6% to 40.0% total formula weight, triethanolamine at 19% total formula weight, and propylene glycol at 1% total formula weight.

Preferably, the present invention uses a 38.0% solution of sodium aluminate salt at 47.4% total formula weight, cold tap water at 32.6% of total formula weight, triethanolamine at 19% of total formula weight and propylene glycol at 1% total formula weight. Alternately, the present invention uses a 45.0% solution of sodium aluminate salt at 40.0% total formula weight, cold tap water at 40.0% of total formula weight, triethanolamine at 19% of total formula weight and propylene glycol at 1% total formula weight. An alternate embodiment of the present invention substitutes a 30% to 50% solution of potassium aluminate for sodium aluminate. It is to be understood, of course, that alternate embodiments can modify or change the concentrations, total formula weight contributions or species from the general chemical group genres of the foregoing without changing the true scope and spirit of the preferred embodiment of the present invention. For example, a stabilizing agent selected from the groups consisting essentially of hydroxycarboxylic or hydroxy dicarboxylic acid, aminoethanol compounds, or secondary or tertiary amines can be used. More specifically, a hydroxycarboxylic or hydroxy dicarboxylic acid selected from the groups consisting essentially of tartaric, lactic or malic acids can be used as a stabilizing agent. Furthermore, a solvent selected from the groups consisting essentially of ethylene series glycols, propylene series glycols or glycol ethers can be used.

The resultant hydrated aluminum compound is amphoteric in nature and can thus be dissolved in either a base or acid. In the preferred embodiment, the aluminum hydroxide compound is dissolved into a strong base, such as sodium hydroxide, by a conventional liquid acid-base reaction. The dissolution phase subsequently removes the H+ion with the OH-ion, thus forming a soluble complex. The preferred embodiment of the present invention uses the following reaction:

$$Al(H_2O)_3(OH)_3(s) + OH^-(aq) \rightarrow Al(H_2O)_2(OH)_4^-(aq)$$

The resultant additive can be added to a paint or stain in either a post-production blend stage or during the paint manufacturing process. When incorporating the additive during the paint manufacturing process the additive is preferably incorporated in the grind or pigment dispersion phase. However, it is possible to incorporate the resultant additive at any stage of the paint making process. For example, an alternate embodiment of the present invention incorporates the additive during the manufacturing of polymers for wood coatings.

Alternate embodiments of the present invention include incorporating an aluminate salt, such as sodium aluminate or potassium aluminate, during the manufacturing of polymers for wood coatings, introducing an aluminate salt, such as sodium aluminate or potassium aluminate, during the manufacturing process of composite wood materials, and directly applying an aluminate salt, such as sodium aluminate or potassium aluminate, directly to the surface of a wood or wood substrate.

This highly reactive complex readily chelates with the phenol groups within the tannins in the wood or wood composite substrates to form an insoluble complex. As such, the resultant insoluble complex will not be affected by the latex paint or stain process or by environmental moisture introductions, thus not being able to migrate through the topcoat of the surface coating system. Furthermore, the preferred embodiment of the present invention uses aluminate salt to help stabilize the insoluble metal chelate in the tannate salt, whereas acids can cause undesirable hydrolysis.

The preferred embodiment of the present invention is preferably used in a two-coat, paint or stain system. With the incorporation of this tannin stain inhibitor within the surface coat or topcoat paint, a separate primer is not required. As such, two separate coats of the paint or stain with present invention additive (i.e. self-priming paint system) is more than sufficient to effectively stabilize the inherent tannate salts within wood and wood composite substrates.

The present invention can be better illustrated with the following example which is intended to explain, and not limit, the invention:

EXAMPLE

A typical, consumer available water-based latex paint with incorporation of the formulation shown in Table 1 was determined to be highly resistant and inhibitive to tannin-stain leaching and migration by adding thereto the below Table 1 described complexing agent for stabilization of phenol groups within the tannate salts:

TABLE 1

| Components | Example A:<br>% of Composition using Sodium Aluminate (45% solution) | Example B:<br>% of Composition using Sodium Aluminate (38% solution) |
|---|---|---|
| Water (cold tap) | 40.0 | 32.6 |
| Sodium Aluminate | 40.0 | 47.4 |
| Triethanolamine (TEA) | 19.0 | 19.0 |
| Propylene Glycol | 1.0 | 1.0 |

The above-described mixtures were created as follows: the water was placed in a glass beaker with a magnetic stir bar. While mixing the water at medium-high speed, the sodium aluminate was added. Once the aluminate was thoroughly incorporated and mixed (approximately 3 minutes), the TEA was added. The temperature of the mixture increased from 68° F. to 100° F. when the TEA was added due to its exothermic reaction with the sodium aluminate. Lastly, the propylene glycol was incorporated into the solution and was allowed to mix for five minutes.

The mixtures were subsequently post-added into a typical flat latex exterior white house paint via a common spatula with a mixture load level of 3.0% total formula weight and incorporated into the grind stage of another typical flat latex exterior white house paint with mixture load levels of 2.0% and 3.0% total formula weight. The test samples prepared were redwood substrates approximately 11.5" by 3.25". The additive enriched paint and comparative control groups were brush applied at approximately a 400 sq. ft./gal. spread rate. The first coat was allowed to air dry for 24 hours. A second surface coat was applied at 400 sq. ft./gal. and allowed to dry for another 24 hours. A humidity-supplemented atmosphere was then introduced to the redwood substrate by placing them in a humidity chamber at 100% humidity for 24 hours to accelerate tannin migration and stain production. The coating system was then evaluated for discoloration of the topcoat, using a calorimeter, and compared to readings prior to testing. In Table 2 is a tabulation of the discoloration measurements after the redwood substrates were in the humidity chamber for 24 hours at 100% humidity.

After testing, the test specimens were rated qualitatively (visually) and quantitatively (color change) to determine stain blocking ability. The quantitative method used to determine the degree of color change is the CIE (Commission International) L*a*b* system where:

L=Lightness a=+red/−green b=+yellow/−blue

The ΔE* defines the total color difference before and after testing. To calculate the ΔE*, the following equation is used:

$$\Delta E^*_{ab} = [(\Delta L^*)^2 + (\Delta a^*)^2 + (\Delta b^*)^2]$$

TABLE 2

| Inhibitor | Initial L*a*b* Readings | Final L*a*b* Readings | ΔE Values |
|---|---|---|---|
| Post-added into typical latex flat exterior house paint | | | |
| Blank control (no inhibitor) | L = 89.16<br>a = −0.55<br>b = 2.53 | L = 87.11<br>a = −0.61<br>b = 3.96 | 2.50 |
| Example B (@ 3.0% t.f.w.) | L = 90.10<br>a = −0.79<br>b = 0.59 | L = 90.11<br>a = −0.56<br>b = 0.01 | 0.64 |
| Incorporated into grind phase of typical latex flat exterior house paint | | | |
| Blank control (no inhibitor) | L = 90.49<br>a = −0.04<br>b = 2.35 | L = 83.82<br>a = −0.02<br>b = 4.20 | 6.92 |
| Example B (@ 3.0% t.f.w.) | L = 92.35<br>a = −0.37<br>b = 1.09 | L = 87.75<br>a = −0.49<br>b = 3.08 | 5.08 |
| Example B (@ 2.0% t.f.w.) | L = 91.91<br>a = −0.27<br>b = 1.17 | L = 86.00<br>a = −0.35<br>b = 3.20 | 6.28 |

Furthermore, the additive enriched paint remaining in the original containers was subsequently tested for longitivity and stability. The pH levels and viscosity readings were taken on a weekly basis on both an oven stable environment maintained at 55° C. and using a freeze-thaw testing process wherein the paint was frozen below 0° C. and then allowed to thaw in a continuous, repetitive fashion. The accelerated heat-age and freeze-thaw tests produced results well within acceptable ranges in respect to changes in pH (±1 unit), viscosity (±15 KU), and overall package condition of the coating.

In summary, as can be seen from the foregoing discoloration readings and stability test results, the present invention produces highly favorable results, at both mixture load levels of 2.0% and 3.0% total formula weight, compared to the control groups. Such results are an improvement of known prior art tannin stain inhibitors.

The foregoing specification describes only the preferred and alternate embodiments of the invention. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A method of blocking tannin migration within wood and wood composite substrates having tannin compounds with phenol groups, comprising the steps of:
   creating an aluminate based chemical composition, said aluminate based chemical composition having the ability to metal chelate with the phenol groups of tannin compounds to produce an insoluble, stable compound;
   incorporating said aluminate based chemical composition into a wood coating product selected from the group consisting of paints, primers and stains, whereby creating a tannin stain inhibiting product; and
   applying said tannin stain inhibiting product to said substrate.

2. The method as claimed in claim 1 wherein said aluminate based chemical composition is an aluminate salt.

3. The method as claimed in claim 1 wherein said aluminate based chemical composition comprises:

water;
an aluminate complexing agent;
a stabilizing agent; and
a solvent.

4. The method as claimed in claim 3 wherein said aluminate complexing agent is an aluminate salt.

5. The method as claimed in claim 4 wherein said aluminate salt is sodium aluminate.

6. The method as claimed in claim 4 wherein said aluminate salt is potassium aluminate.

7. The method as claimed in claim 3 wherein said stabilizing agent is selected from the group consisting of secondary and tertiary amines.

8. The method as claimed in claim 3 wherein said stabilizing agent is an aminoethanol compound.

9. The method as claimed in claim 8 wherein said aminoethanol compound is triethanolamine.

10. The method as claimed in claim 3 wherein said stabilizing agent is selected from the group consisting of hydroxycarboxylic acid and hydroxy dicarboxylic acid.

11. The method as claimed in claim 10 wherein said stabilizing agent is selected from the group consisting of tartaric acid, lactic acid, and malic acid.

12. The method as claimed in claim 3 wherein said solvent is selected from the group consisting of ethylene series glycols, propylene series glycols, and glycol ethers.

13. The method as claimed in claim 1 wherein said wood coating product is a polymer selected from the group consisting of acrylics, modified acrylics and alkyds.

14. The method as claimed in claim 1 wherein said substrate is a manufactured composite wood substrate, and the step of applying said tannin stain inhibiting product to said substrate comprises the step of incorporating said tannin stain inhibiting product directly into said manufactured composite wood substrate while being manufactured.

15. A process of producing a tannin stain inhibitor comprising the steps of:
   mixing together water and an aluminate complexing agent to create a first substance;
   mixing together said first substance with a stabilizing agent to create a second substance; and
   mixing together said second substance with a solvent to create said tannin stain inhibitor.

16. The process as claimed in claim 15 further comprising the step of mixing said tannin stain inhibitor with a wood coating product selected from the group consisting of paints, primers and stains.

17. The process as claimed in claim 16 wherein said wood coating product is a polymer selected from the group consisting of acrylics, modified acrylics and alkyds.

18. The process as claimed in claim 15 wherein said aluminate complexing agent is an aluminate salt.

19. The process as claimed in claim 18 wherein said aluminate salt is sodium aluminate.

20. The process as claimed in claim 18 wherein said aluminate salt is potassium aluminate.

21. The process as claimed in claim 15 wherein said stabilizing agent is selected from the group consisting of secondary and tertiary amines.

22. The process as claimed in claim 15 wherein said stabilizing agent is an aminoethanol compound.

23. The process as claimed in claim 22 wherein said aminoethanol compound is triethanolamine.

24. The process as claimed in claim 15 wherein said stabilizing agent is selected from the group consisting of hydroxycarboxylic acid and hydroxy dicarboxylic acid.

25. The process as claimed in claim 24 wherein said stabilizing agent is selected from the group consisting of lactic acid, tartaric acid, and malic acid.

26. The process as claimed in claim 15 wherein said solvent is selected from the group consisting of ethylene series glycols, propylene series glycols, and glycol ethers.

27. A tannin stain inhibiting chemical composition, comprising:

water;

an aluminate complexing agent;

a stabilizing agent; and a solvent.

28. The composition as claimed in claim 27 wherein said aluminate completing agent is an aluminate salt.

29. The composition as claimed in claim 28 wherein said aluminate salt is sodium aluminate.

30. The composition as claimed in claim 28 wherein said aluminate salt is potassium aluminate.

31. The composition as claimed in claim 27 wherein said stabilizing agent is selected from the group consisting of secondary and tertiary amines.

32. The composition as claimed in claim 27 wherein said stabilizing agent is an aminoethanol compound.

33. The composition as claimed in claim 32 wherein said aminoethanol compound is triethanolamine.

34. The composition as claimed in claim 27 wherein said stabilizing agent is selected from the group consisting of hydroxycarboxylic acid and hydroxy dicarboxylic acid.

35. The composition as claimed in claim 34 wherein said stabilizing agent is selected from the group consisting of lactic acid, tartaric acid, and malic acid.

36. The composition as claimed in claim 27 wherein said solvent is selected from the group consisting of ethylene series glycols, propylene series glycols, and glycol ethers.

37. The chemical composition of claim 27, wherein said chemical composition comprises 0–75% water, 10–100% aluminate complexing agent, 0.1–30% stabilizing agent, and 0.1–10% solvent.

38. A paint mixture, including the chemical composition of claim 27, that, when applied to a wood or wood composite substrate surface, inhibits the migration and leachate of tannins along the applied area.

39. The paint mixture of claim 38, wherein said paint mixture includes 0.1–30% total formula weight of said chemical composition.

40. A stain coating system mixture, including the chemical composition of claim 27, that, when applied to a wood or wood composite substrate surface, inhibits the migration and leachate of tannins along the applied area.

41. The stain coating system mixture of claim 40, wherein said stain coating mixture includes 0.1–50% total formula weight of said chemical composition.

42. A method of blocking tannin migration within wood and wood composite substrates having tannin compounds with phenol groups, comprising the step of applying an aluminate based compound to the surface of said wood and wood composite substrates, said aluminate based compound comprising water, an aluminate complexing agent, a stabilizing agent and a solvent.

43. The method as claimed in claim 42 wherein said aluminate complexing agent is an aluminate salt.

* * * * *